Sept. 15, 1959     H. B. SEDGFIELD ET AL     2,903,891
GYROSCOPIC APPARATUS
Original Filed March 3, 1950     2 Sheets-Sheet 2

Inventors
HUGH B. SEDGFIELD
JOHN A. TAYLOR
DANIEL MACDOUGALL
By
Herbert ...
THEIR Attorney

United States Patent Office 2,903,891
Patented Sept. 15, 1959

2,903,891
GYROSCOPIC APPARATUS

Hugh Brougham Sedgfield, Hampton, John Alfred Taylor, Kingsbury, and Daniel MacDougall, Tynemouth, England, assignors to Sperry Gyroscope Company, Limited, Brentford, England, a British company Continuation of application Serial No. 147,444, March 3, 1950. This application November 13, 1957, Serial No. 696,077

12 Claims. (Cl. 74—5.4)

This invention relates to gyroscopic apparatus and in particular to gyroscopic apparatus of the kind in which a gyroscope is universally mounted in a support or on a platform. In such apparatus the rotor case with the rotor spinning in it is referred to as the gyroscope.

It is well known to those skilled in the gyroscopic art that, if a gyroscope is universally mounted in a support for angular movement about mutually perpendicular axes with its spin axis pointing along a direction in space, it will keep pointing along this direction in space in the absence of disturbing torques. Since, however, it is impossible to avoid disturbing torques no gyroscope hitherto known will keep its direction in space for any appreciable length of time. Disturbing torques acting to precess the gyroscope away from its direction in space are due to various factors connected with the construction and mounting of the gyroscope.

Disturbing torques on the gyroscope may be produced by the action of unbalanced body forces resulting from various causes. If the rotor is mounted in the rotor case in such a manner that it is possible to produce a small relative displacement of the rotor and its case, and if the platform or support on which the gyroscope is mounted is subjected to accelerations, or is caused to change its attitude, a shift in the center of gravity of the gyroscope relative to one of its axes of support may take place. The resultant of acceleration and gravity forces acting at the center of gravity might thus cause application of an unbalanced torque about the axis of support.

Disturbing torques due to unbalanced body forces may also be caused by the effect of temperature changes on the gyroscope which may result in relative displacement of different members forming the gyroscope and also by a bodily movement of the gyroscope under the action of acceleration forces in such a manner as to shift its center of gravity laterally of one of its axes of support.

Disturbing torques may also be produced by frictional forces at the bearing supports for the gyroscope when relative angular movement of the gyroscope and its supporting platform takes place.

In some cases it is extremely desirable to produce a gyroscope which when universally mounted in a support or on a platform will maintain its set direction in space for a considerable time. For example, it may be desirable to provide an absolute reference in space for a period of time sufficient to enable a craft to be guided over a long range. It will however be appreciated from the foregoing that it is extremely difficult in practice to construct a gyroscope which, when universally mounted, will wander or drift away from its set direction in space at a rate which is sufficiently slow to make the gyroscope useful in the applications now contemplated.

It is an object of the present invention to provide gyroscopic apparatus comprising a gyroscope constructed and arranged in its support or on a platform such that the effect of disturbing torques is much smaller than in prior gyroscopic apparatus and so that its spin axis will only deviate from a set direction in space at an extremely slow rate in comparison with the rates at which hitherto known types of gyroscopes deviate.

In accordance with one aspect of the present invention there is provided gyroscopic apparatus comprising a gyroscope rotor case in the form of a closed figure of revolution with a fixed central tubular portion extending along its principal axis of symmetry so as to provide in the interior of the case a totally enclosed annular space in which a hollow rotor is mounted on said tubular portion for spinning about an axis coincident with the said principal axis, the rotor case being totally immersed in fluid carried in and filling the interior of a surrounding follow-up frame so that its weight is substantially balanced by buoyancy forces provided by the fluid and so that the center of gravity of the gyroscope is substantially at the center of buoyancy, a locating arrangement connecting the follow-up frame and the rotor case in such a manner as to provide, substantially at the center of buoyancy and in the interior of the central tubular portion, a universal mounting for the case permitting limited angular displacements of the case relative to the follow-up frame about two mutually perpendicular axes substantially perpendicular to the said principal axis, from a normal position in which a predetermined axis of the follow-up frame is in line with the principal axis of the rotor case, a universal support for the follow-up frame, a pick-off arrangement providing signals measuring the relative angular displacements about two different axes between the follow-up frame and the rotor case from their said normal position of alignment and servo means responsive to signals received from said pick-off arrangement and operative on the universal support for the follow-up frame for maintaining the said normal position of alignment between the axis of the follow-up frame and the principal axis of the rotor case.

The whole apparatus is preferably maintained at a constant temperature. Alternatively or additionally one portion of the shell of the follow-up container comprises a flexible diaphragm to enable expansions and contraction of the fluid to take place due to the temperature changes. It is desirable that the diaphragm should be preloaded so as to be able to withstand the maximum fluid pressures that might be expected to be imparted to it as a result of accelerations.

It will be appreciated that the present invention enables substantially the whole of the load of the gyroscope to be taken by the fluid and that only an insignificantly small part of the static load is taken by the locating arrangement.

The follow-up system in accordance with the present invention, as with similar follow-up systems in known gyroscopic apparatus, provides an arrangement for preventing the application of precessing torques to the gyroscope due to frictional forces acting at the universal support when relative angular movement of the gyroscope and the support or platform on which the gyroscope is mounted takes place. The friction forces generated may produce only a small angular movement of the follow-up frame relative to the rotor case, the load being thereafter taken up by the servo means. The movement of the follow-up frame relative to the rotor case has substantially no effect on the case due to the substantially frictionless liquid support.

In order to avoid residual unbalanced torques on the gyroscope due to temperature changes, the rotor and its rotor case are constructed in such a manner that uniform expansion or contraction of their various parts takes place during temperature changes and any parts that do move relatively to each other are returned to their normal relative positions when the original temperature is reached again.

It is an extremely desirable additional feature of the invention that means are provided for maintaining the temperature of the fluid constant, in order to prevent changes in its density which could produce movement of the case in the fluid and thus impose a load on the locating arrangement. The means for maintaining the temperature constant may be of any convenient form. A pick-off may be used for detecting changes in the expansion and contraction of the fluid due to temperature changes and the signals representing the changes in the volume may be used to adjust the temperature.

According to another aspect of the invention there is provided gyroscopic apparatus comprising a sensitive gyroscopic element having a completely enclosing casing which has the form of a figure of revolution and is completely immersed in mercury contained in and completely filling the interior of a closed container, the sensitive element being constructed largely or mainly of heavy alloy so as to have a weight substantially equal to its volume of mercury and comprising also locating means for locating the sensitive element in the interior of the container with angular freedom of movement about two axes intersecting substantially at the center of buoyancy of the sensitive element.

In order that the invention may be more clearly understood a particular embodiment thereof, in which one gyroscope only according to the invention is used to provide a gyroscopic reference instrument, will now be described by way of example with reference to the accompanying drawings in which:

Fig. 3 is an elevation of a pick-off device used in the gyroscopic apparatus;

Figs. 4 and 5 are sections showing the universal pivot structure;

Fig. 6 is an exploded view of a torque motor used in the gyroscopic apparatus.

Figure 1:
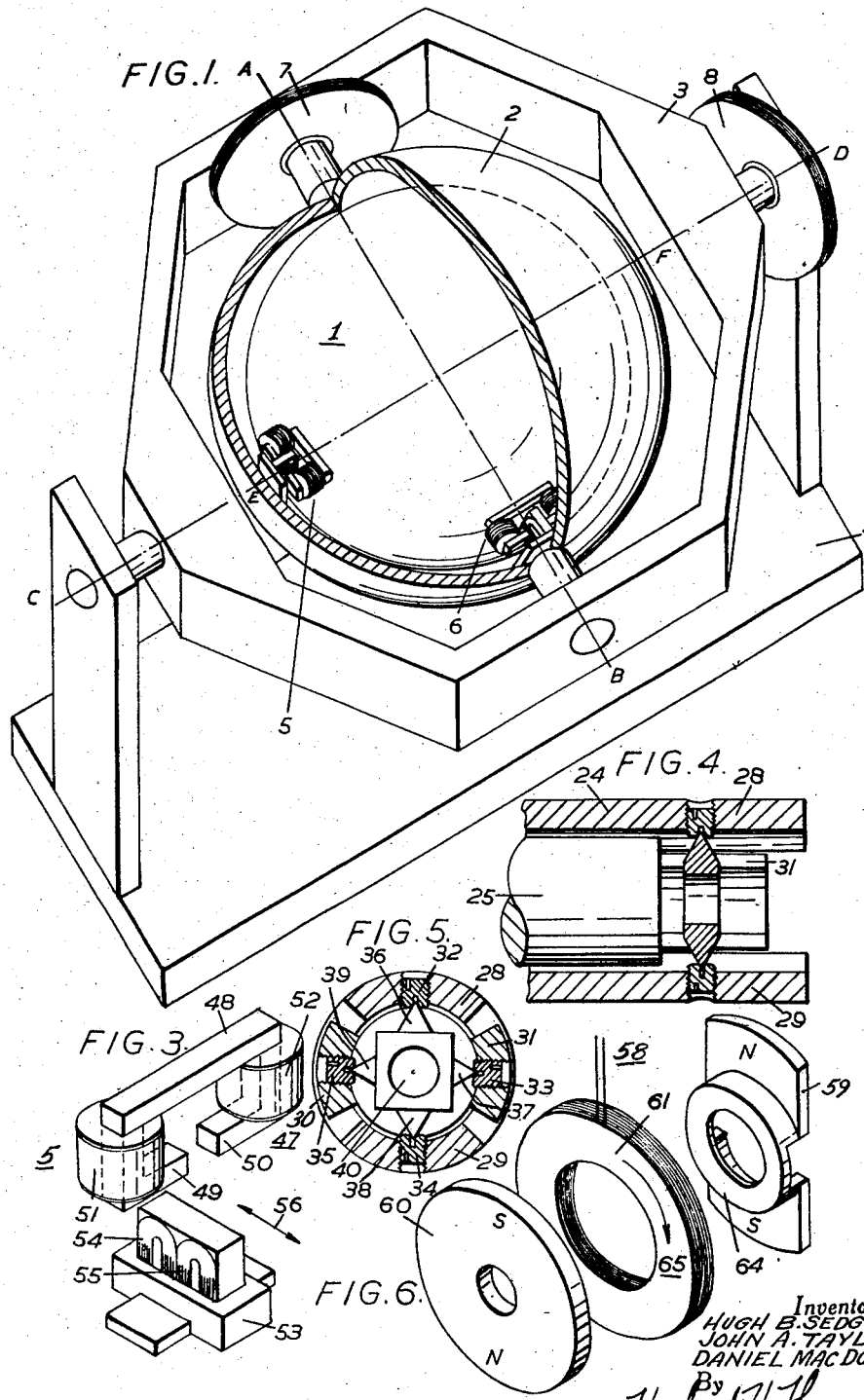
Fig. 1 is a schematic view of gyroscopic apparatus embodying the invention.
Figure 2:
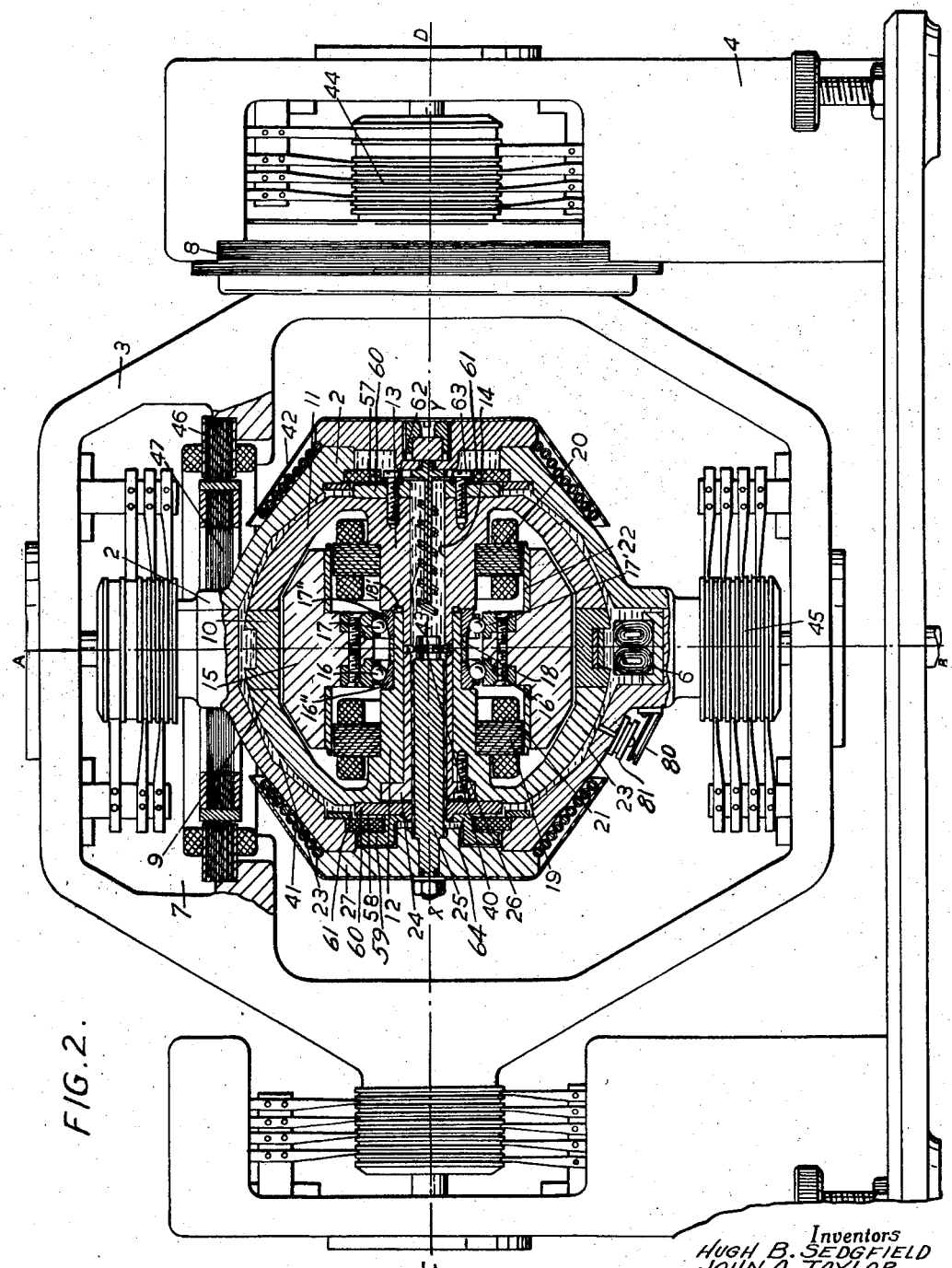
Fig. 2 is a plan view, partly in section, of the gyroscopic apparatus of Fig. 1 taken parallel to the plane of the gimbal frame with the main support turned through 90° about the outer gimbal axis and the gyroscope turned through 90° about the inner gimbal axis.

Referring to Figs. 1 and 2, gyroscopic apparatus embodying the present invention comprises a rotor case 1 mounted, in a manner to be described in greater detail later, in an enclosing follow-up frame 2 which in turn is mounted for angular movement about two mutually perpendicular axes AB, CD, in a main support 4 by means of a gimbal frame 3. The rotor case 1 is in the form of a figure of revolution about an axis hereinafter referred to as its principal axis and shown in Fig. 2 as coincident with an axis XY of the follow-up frame that is normal to the inner gimbal axis AB. Also as will be seen the spin axis of the rotor is substantially coincident with the principal axis of the rotor case. The mounting of the rotor case within the follow-up frame (which is described in more detail later) is such as to permit only small angular displacements between the principal axis of the rotor case and the axis XY, and, in operation, the follow up control system maintains the axis XY of the follow-up frame even closer in line with the principal axis of the rotor case and therefore with the spin axis of the gyroscope.

In Fig. 2 the axis XY and therefore the spin axis of the rotor is shown as in alignment with the outer gimbal axis CD. This is for convenience of illustration only; in practice the instrument provided by this embodiment of the invention would probably be used only in conditions, and for such periods, as the spin axis of the rotor does not approach alignment with the gimbal axis. In fact the preferred positions of the spin axis and therefore of the axis XY of the follow-up frame are in the neighborhood of 90° from alignment with the outer gimbal axis CD, that is 90° from the position shown in Fig. 2.

As shown in Fig. 1 there is provided a pick-off arrangement comprising a pair of pick-off devices 5 and 6 (shown in greater detail in Fig. 3), for detecting relative angular displacements between the follow-up frame 2 and the rotor case 1 about the two axes AB and EF respectively, and for supplying electrical signals substantially proportional to the angular displacements. The electrical signal from the pick-off device 5 is applied to a servomotor 7 mounted so that, when energized from the pick-off, it produces movement of the follow-up frame 2 about the axis AB. The electrical signal from the pick-off device 6 is applied to the servomotor 8 mounted so that, when energized from the pick-off, it produces movement of the gimbal frame 3 about the axis CD and thereby movement of the follow-up frame 2 about the axis EF. The rotor case 1 and the follow-up frame 2 may be set together relatively to the main support 4 by suitable angular displacements about the gimbal axes AB and CD so that the spin axis of the rotor points in any predetermined direction in space. Any direction so set, with certain limitations, will be closely maintained with a very low wander rate due to the special constructional and other features of the gyroscopic apparatus provided by the invention. The limitations are that the rotor axis should not approach a position of alignment with the outer gimbal axis CD as in that position certain difficulties in operation may be expected. The described pick-off and motor arrangement provides a means for slaving the frame 2 to the case 1.

The rotor case 1 is shown as comprising a substantially spherical shell constructed of two symmetrical outer parts 9 and 11 and an inner annular concentric part 10. All the parts are made of heavy material, such as tungsten alloy, and the outer parts 9, 11 are held together rigidly by means of screws (not shown) passing through the inner part 10. The outer parts 9, 11 have hollow center legs 12, 13, protruding inwards so that when the rotor case is assembled the two protruding legs nearly meet to form a central hollow tubular element 14 inside the rotor case. This arrangement provides an internal wall structure defining a channel or opening along the rotor axis. The axis of the tube is the axis of symmetry or principal axis of the rotor case. The rotor 15 is hollow and substantially spool-shaped, and is made of the same material as the rotor case in order to avoid differential expansion due to temperature changes. Such differential expansion might cause unbalance of the gyroscope and thus produce wander. The leg 12 is longer than the leg 13 so that it can serve as a support for the rotor bearing. Leg 13 has a tubular extension that fits into the bore of leg 12. In other words the two legs are partly telescoped. The rotor is mounted for spinning about the principal axis of the rotor case by means of bearings 16, 17 whose outer races 16', 17', are rigidly secured to the rotor by means of screws (not shown) and whose inner races 16", 17", fit closely on to the central leg 12 and are clamped longitudinally between shoulders on the two legs with a spacing washer 18 between them. By suitable choice of the thickness of this washer it may be insured that a predetermined longitudinal load is applied to the bearings when the rotor parts of the rotor case are clamped together by screws at their periphery during assembly. A resilient washer 18' is interposed between the end of leg 12 and a shoulder on leg 13 on the inner side of the inner bearing race 17" to seal the joint between the two legs against the entry or exit of fluid.

The rotor is electrically driven by means of two induction motors whose stator windings 19, 20 are shown as mounted on the two symmetrical central legs 12, 13 respectively. The inductors 21, 22 of the motors are attached to the rotor.

The rotor and rotor case are so constructed as to provide substantially complete symmetry about the median plane normal to the principal axis of the rotor case. The whole construction is rigid and substantially inelastic. The rotor is completely enclosed in the rotor case which may be evacuated to avoid heating due to windage or filled with hydrogen or helium as these gases have relatively good thermal conductivity and thus tend to equalize differences of temperature in different parts of the rotor case.

The rotor case 1 is completely immersed in mercury 23 which completely fills the follow-up frame 2. The weight of the rotor case and its contents are such that they just float in the mercury. The floating rotor case is located relatively to the follow-up frame by locating and universally pivoting means whose pivot center substantially coincides with the center of symmetry and therefore of buoyancy of the rotor case.

The locating and pivoting means for the rotor case comprises a hollow tubular member 24, attached to the rotor case by means of screws (one of which is shown at 26) and a rod 25 attached to the follow-up frame by the end piece 27 and extending inwards through the hollow tubular member 24. Both the tubular member 24 and the rod 25 have portions cut away from their inner ends to leave on each a pair of opposed extending fingers 28, 29, and 30, 31, as shown in Figs. 4 and 5. The fingers 28, 29, 30, 31 are provided with adjustable bearing mountings 32, 33, 34, 35 in which the pivot points 36, 37, 38, 39 of the double axis pivot unit 40 are located. This arrangement provides a universal joint analogous to an internal gimbal ring 40 between the rotor case 1 and the follow-up frame 2 permitting limited relative angular movement between them about the two perpendicular axes of the unit 40, the weight of which is, of course, substantially buoyed in the mercury. The maximum relative angular movement between the rotor case and the follow-up frame is dependent upon the gap between the rod 25 and the tubular member 24, but in view of the fact that the follow-up frame closely follows the rotor case, the actual relative movements that take place are much smaller than that rendered possible by the gap.

With the arrangement described a substantially frictionless mounting of the rotor case in the follow-up frame is obtained, thereby reducing wander of the gyroscope.

In order that the temperature of the follow-up frame and its contents may be kept substantially constant at a predetermined temperature an automatically controlled heating arrangement is provided. This arrangement comprises the heating coils 41, 42 surrounding the follow-up frame, the coils being normally continuously energized so as to heat the follow-up frame and its contents. However, if the temperature of the assembly exceeds the predetermined temperature a thermostatically operated switch cuts off the electrical supply to the coils. The switch may comprise a pair of contacts 80, one of which is controlled by a bellows device 81 mounted on the follow-up frame and filled with mercury which is in communication with the mercury in the follow-up frame so that the latter can expand into it when the temperature of the gyroscope is too high thereby causing the contacts to close and the supply of energy to the coils to be cut off until such time as the temperature has been reduced to the predetermined temperature. Thus it will be appreciated that differential expansion of the various parts forming the assembly will be substantially eliminated and the disturbances causing unbalance thus reduced.

Electrical energy for driving the rotor and operating the various pick-offs and torque motors is conducted from the main support 4 through slip rings 44 and 45 and through the light flexible leads 43.

The servomotors 7 and 8 are induction motors. Servomotor 7 is shown in greater detail in Fig. 2. It comprises the stator windings 46 mounted on the gimbal frame 3 and the inductor 47 mounted on the follow-up frame 2. Energization of a control winding of the motor produces angular movement of the follow-up frame about the axis AB in a direction depending on the sense of energization relative to the energization of a constantly energized winding of the motor. The servomotor 8 is similarly constructed and comprises stator windings carried on the main frame 4 and an inductor carried on the gimbal frame 3, so that energization of the motor produces movement of the gimbal frame 3 about axis CD and therefore of the follow-up frame 2 about the axis EF in a direction depending on the sense of energization.

The pick-off devices 5 and 6 are identical in construction and one is illustrated more clearly in Fig. 3. Referring to Fig. 3, the pick-off comprises a primary element having a core 48 of magnetic material forming pole pieces 49, 50 with opposed pole faces. Windings 51, 52 on the core are energized by alternating current and produce an alternating magnetic field across the air-gap between the poles 49 and 50. The pick-off also comprises a secondary element movable in the air-gap and carrying a pair of windings 54, 55 having their axes side by side and directed along the direction of the flux in the air-gap. These windings are connected in series opposition so that the E.M.F.'s induced in them will oppose each other. The primary and secondary elements of the pick-off are mounted on the rotor case 1 and follow-up frame 2 respectively in such a manner that the windings are normally symmetrically positioned with respect to the field with the result that each winding receives equal induced energization from the field and no output signal is provided by the pick-off. If, however, the armature moves in one direction or the other in the direction of the arrows 56 the E.M.F. induced in one of the windings 54, 55, will be greater than that induced in the other winding and an output signal will therefore be provided by the pick-off. The magnitude and phase sense of the E.M.F. will depend upon the amount and direction of the movement of the secondary element relative to the primary element.

Pick-off 5 detects movement of the follow-up frame 2 relative to the rotor case 1 about the axis AB and pick-off 6 detects movement of the follow-up frame relative to the rotor case about the axis EF. The signals from the pick-offs 5 and 6 are respectively applied to control the operation of the servomotors 7 and 8.

In operation the platform 4 is mounted on the body in which it is desired to provide a reference direction in space irrespective of turning movements of the body and the axis of the rotor is set to the predetermined reference direction. If the body turns in a direction having a component about the axis AB, the frame 3 will also be moved about that axis and due to the frictional forces at the axis of support of the follow-up frame 2 in the gimbal frame 3, there will also be a tendency for the follow-up frame to move about the axis AB. In some cases, a small movement of the follow-up frame will actually take place about the axis AB and this will be detected by the pick-off 5 which will supply an appropriate signal to the servomotor 7 to restore the follow-up frame to its normal position relative to the rotor case 1. It will thus be seen that the frictional forces generated when the main support 4 is turned in a direction having a component about the axis AB are not applied to the rotor case and rotor to produce precessional disturbances but are absorbed by the servo-controlled follow-up system. The movement of the follow-up frame relative to the rotor case has substantially no effect on the case due to the substantially frictionless liquid support. Similar considerations apply to turning movements of the platform 4 in a direction having a component about the axis CD.

Gyroscopic apparatus is thus provided by the invention in which the spin axis of the rotor will only deviate from its set direction in space at a very slow rate. The particular embodiment described may be used as a free gyroscope not monitored from any controlling device, such as a magnetic compass or a pendulum, and within the very large limits it is very effective when so used. The invention may of course also be applied in more elaborate gyroscopic apparatus such as have frequently been proposed employing two or more gyroscopes having follow-up systems for three mutually perpendicular axes.

For certain applications it may be desirable to apply precessional torques to a gyroscope similar to that described above. For example, it may be desirable to make the gyroscope precess at the same rate as the earth turns about its axis or it may be desirable to control it from a magnetic compass or a pendulum. For this purpose two torque motors are illustrated as provided in Fig. 2 of the drawings for applying torques about two mutually perpendicular axes perpendicular to the rotor spin axis. These torque motors are designated by the reference numerals 57 and 58. An exploded view of torque motor 58 is shown in Fig. 6. It comprises a permanent magnet system consisting of two flat parallel plates 59, 60 magnetized with opposite polarities along parallel axes. The plate 59 is in two portions separated by a gap transverse to the axis of magnetization, these being bridged by a soft iron boss 64 that serves to space the two plates 59, 60 apart. The two plates 59, 60 are rigidly secured to each other and to the rotor by screws similar to those shown at 62, 63 in torque motor 57. An energizable coil 61 is rigidly fixed to the follow-up frame 2 so as to lie between the two plates 59 and 60 and to surround the central boss 64 of the part 59 without touching either of the plates 59, 60 or the boss 64. Thus the upper and lower portions of the coil 61 are disposed in the magnetic fields in the air-gaps between the upper N-S poles and lower S-N poles of the magnetic system. When the coil is energized forces will be produced in the same direction between the upper part of the coil and the upper N-S poles and between the lower part of the coil and the lower S-N poles and therefore between the follow-up frame and the rotor case parallel to the axis AB as shown in Fig. 2. These forces operate to precess the gyroscope about the axis AB. Torque motor 57 functions similarly about a perpendicular axis and therefore operates to precess the gyroscope about an axis perpendicular to AB and to the spin axis of the rotor, that is the axis normal to the plane of Fig. 2.

It will be appreciated that many different embodiments of the invention may be realized. For example, the type of locating means used to locate the rotor case in the follow-up frame depends on the accuracy required from the gyroscopic apparatus, that is, on the rate of wander permissible.

In another form a thin circular diaphragm is attached at its periphery to the interior of the hollow shaft and its center attached to a tension wire passing through it and attached by the two ends to the follow-up frame.

In order to prevent damaging loads from being imposed on the locating means due to acceleration forces acting when the gyroscope is initially brought into operation, stops may be provided for preventing angular movement of the case relative to its supporting follow-up frame. Such means may take any suitable form.

While the invention has been described in its preferred embodiments, it is to be understood that the words which have been used are words of description rather than of limitation and that changes within the purview of the appended claims may be made without departing from the true scope and spirit of the invention in its broader aspects.

This application is a continuation of our prior application for Gyroscopic Apparatus, Serial No. 147,444, filed March 3, 1950, now abandoned.

What is claimed is:

1. Gyroscopic apparatus comprising a universally mounted follow-up frame providing a closed hollow receptacle containing a fluid, a closed hollow case with a gyroscopic rotor mounted therein having a central tubular element concentric with the rotor axis providing an opening in the case along the axis, a fluid in the receptacle portion of the follow-up frame in which the case is immersed to buoyantly support the same in the frame, the fluid filling the opening in the case provided by the tubular element, said case and rotor being so constructed and arranged as to have a central common center of gravity and symmetry on the rotor axis, a universal mounting at the gravitational and symmetrical center of the case in said opening having a part connected to the tubular element and a part connected to the follow-up frame, said mounting permitting limited angular movement between the case and frame, and means for slaving said frame to said case.

2. Gyroscopic apparatus as claimed in claim 1, in which said universal mounting is a two-axis pivot unit having four pivots disposed in quadrature normally situated in a plane at right angles to the rotor axis and including the gravitational and symmetrical center of the case.

3. Gyroscopic apparatus as claimed in claim 1, in which said tubular element is formed of two telescopically fitted parts.

4. Gyroscopic apparatus as claimed in claim 1, in which the fluid and rotor case are of such material as to approximately locate the center of buoyancy of the case at a point substantially corresponding to the common centers of gravity and symmetry on the rotor axis.

5. Gyroscopic apparatus as claimed in claim 4, in which said tubular element is formed of two axially spaced tubes having a resilient sealing ring therebetween.

6. Gyroscopic apparatus as claimed in claim 4, in which said follow-up frame includes electrically energized heating coils mounted thereon and thermostatic means responsive to changes in the temperature of said liquid controlling the current supply to said coils.

7. Gyroscopic apparatus as claimed in claim 4, including a torque motor for precessing said case having armature and coil parts, one of which is fixed to the case and the other of which is fixed to the frame.

8. Gyroscopic apparatus comprising a frame defining a closed chamber filled with mercury, a closed case with a gyroscopic rotor mounted therein constructed of material such that its weight is substantially equal to the weight of mercury corresponding to its volume whereby the case is buoyantly supported within the chamber in a completely immersed condition within the mercury, and means within the chamber for mounting the case with angular freedom about two axes intersecting substantially at the center of buoyancy of the case.

9. Apparatus as claimed in claim 8, in which the closed case and gyroscopic rotor are mainly constructed of a tungsten alloy.

10. In a gyroscopic apparatus, a follow-up support, a closed hollow case universally mounted therein, a gyroscopic rotor mounted in said case, said case having a central internal wall structure or tube along the rotor axis, said case and rotor being so constructed and arranged as to have its center of gravity along and at the center of the rotor axis, a bearing between the exterior of said tube and the interior of the rotor mounting said rotor for spinning about the axis of the tube, said support having a rod projecting half way through said tube, and a universal mounting within said tube at the gravitational center of said case, comprising a part connected to said tube and a part connected to said rod to provide a universal mounting between said support and case.

11. Gyroscopic apparatus comprising a frame defining a closed chamber filled with a liquid, a closed case with a gyroscopic rotor mounted therein constructed of material such that its weight is substantially equal to the weight of the liquid displaced whereby the case is buoyantly supported within the chamber in a completely immersed condition within the liquid, means within the chamber for mounting the case with angular freedom about two axes intersecting substantially at the center of gravity of the case, electrical heating means for the liquid, and a thermostat responsive to the temperature of the liquid for controlling the current to said heating means.

12. Gyroscopic apparatus comprising a frame defining a closed chamber filled with mercury, a closed case with a gyroscopic rotor mounted therein constructed of material such that its weight is substantially equal to the weight of mercury displaced whereby the case is buoyantly supported within the chamber in a completely immersed condition within the mercury, means within the chamber for mounting the case with angular freedom about two axes intersecting substantially at the center of gravity of the case, and means for stabilizing said chamber from said case.

No references cited.